United States Patent
Doerr et al.

(10) Patent No.: US 7,372,848 B2
(45) Date of Patent: *May 13, 2008

(54) DYNAMICALLY CONTROLLED PACKET FILTERING WITH CORRELATION TO SIGNALING PROTOCOLS

(75) Inventors: Bradley S. Doerr, Colorado Springs, CO (US); Steve Luna, Colorado Springs, CO (US); Stewart Jones, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1207 days.

This patent is subject to a terminal disclaimer.

(21) Appl. No.: 10/268,985

(22) Filed: Oct. 11, 2002

(65) Prior Publication Data

US 2004/0071130 A1    Apr. 15, 2004

(51) Int. Cl.
*H04L 12/66* (2006.01)
(52) U.S. Cl. ........................... 370/352; 370/356
(58) Field of Classification Search ........ 381/352–356, 381/328–329, 335, 349
See application file for complete search history.

(56) References Cited

U.S. PATENT DOCUMENTS

| 7,130,282 | B2 * | 10/2006 | Black | 370/352 |
| 2001/0005382 | A1 * | 6/2001 | Cave et al. | 370/352 |
| 2004/0022237 | A1 * | 2/2004 | Elliott et al. | 370/356 |
| 2004/0057449 | A1 * | 3/2004 | Black | 370/432 |

OTHER PUBLICATIONS

U.S. Application entitled, "Real-Time Protocol (RTP) Flow Analysis Using Network Processor," Doerr, et al., Agilent, filed Oct. 11, 2002.

* cited by examiner

*Primary Examiner*—Suhan Ni

(57) ABSTRACT

A host processor operating together with a network processor to detect packet media streams on a link of a packet network in accordance with a trigger. The network processor captures substantially all packets on the link in real-time to thereby capture communications transmitted via packets on the link. Each communication has at least one corresponding packet media stream. The host system communicates with the network processor to detect respective packet media streams from the captured packets in accordance with a trigger.

37 Claims, 2 Drawing Sheets

DYNAMICALLY CONTROLLED PACKET FILTERING WITH CORRELATION TO SIGNALING PROTOCOLS

BACKGROUND OF THE INVENTION

1. Field of the Invention

The present invention relates to a network processor and a host system which operate together to capture packets on a link of a high-speed packet network and detect respective packet media streams from the captured packets in accordance with a trigger.

2. Description of the Related Art

Communications are often transmitted over a high-speed, packet network. For example, a communication might be a voice over Internet Protocol (VOIP) telephone call comprised of signaling packets and corresponding Internet Protocol (IP) packet media streams. The signaling packets include information indicating, for example, when the VOIP telephone call is initiated, when the VOIP telephone call ends, what parties are participating in the VOIP telephone call, etc. The signaling packets would typically be based on a signaling protocol such as, for example, SIP. SIP is a well-known protocol used for signaling packets of a VOIP telephone call. However, many other signaling protocols are available.

The packet media streams (often referred to as "flows") are formed of media packets which carry data. If the communication is a VOIP telephone call, the media packets would typically be real-time protocol (RTP) packets. RTP is a well-known protocol used for media packets of a VOIP telephone call.

FIG. 1 is a diagram illustrating the use of a call signaling analyzer to monitor a VOIP telephone call. Referring now to FIG. 1, a call signaling analyzer 4 is directly connected to a network link 6 of a network under test. Call signal analyzer 4 can detect the signaling packets (i.e., the SIP packets) for a respective VOIP telephone call transmitted over network link 6.

However, call signaling analyzer 4 cannot detect the packet media streams (i.e., the RTP packets). Therefore, with call signaling analyzer 4 in FIG. 1, only information conveyed by the signaling packets can be monitored. For example, from the signaling packets, it can only be determined when the VOIP telephone call is initiated, when the VOIP telephone call ends, what parties are participating in the VOIP telephone call, etc.

Moreover, it would often be desirable to detect specific packet media streams in accordance with a trigger (i.e., a specification, such as the occurrence of a specific event, for triggering capture of respective media streams). Call signaling analyzer 4 in FIG. 1 cannot detect specific packet media streams in accordance with a trigger.

SUMMARY OF THE INVENTION

Accordingly, the present invention captures substantially all packets on a network link to thereby capture communications transmitted via packets on the network link, and detects respective packet media streams of the communications in accordance with a trigger.

Additional aspects of the invention will be set forth in part in the description which follows, and, in part, will be obvious from the description, or may be learned by practice of the invention.

An apparatus provides a network processor capturing substantially all packets on a link of a packet network in real-time to thereby capture communications transmitted via packets on the link. Each communication has at least one corresponding packet media stream. The network processor is dynamically reconfigurable to detect respective packet media streams from the captured packets in accordance with a trigger.

The present invention provides an apparatus including a network processor and a host system. The network processor captures substantially all packets on a link of a packet network in real-time to thereby capture communications transmitted via packets on the link. Each communication has at least one corresponding packet media stream. The host system communicates with the network processor to detect respective packet media streams from the captured packets in accordance with a trigger.

The present invention also provides a method including (a) capturing substantially all packets on a link of a packet network in real-time to thereby capture communications transmitted via packets on the link, each communication having corresponding signaling packets and at least one corresponding packet media stream; (b) filtering the captured packets to separate the signaling packets from the packet media streams; (c) analyzing the separated signaling packets to identify the communications; (d) obtaining respective packet media streams from the separated packet media streams, in accordance with a trigger applied to the identified communications; (e) producing flow information records for the obtained packet media streams; and (f) analyzing the flow information records.

In addition, the present invention provides a network processor capturing substantially all packets on a link of a packet network in real-time to thereby capture communications transmitted via packets on the link. Each communication has corresponding signaling packets and at least one corresponding packet media stream. A host system communicates with the network processor to filter the captured packets to thereby separate the signaling packets from the packet media streams, analyze the separated signaling packets to identify the communications, obtain respective media streams corresponding to captured communications from the separated packet media streams in accordance with a trigger applied to the identified communications, produce flow information records for the obtained packet media streams, and analyze the flow information records.

Further, the present invention provides an apparatus including a signaling analyzer and a network processor. The network processor captures substantially all packets on a link of a packet network in real-time to thereby capture communications transmitted via packets on the link. Each communication has corresponding signaling packets and at least one corresponding packet media stream. The network processor includes (a) a filter filtering the captured packets to separate the signaling packets from the packet media streams, the separated signaling packets being provided to the signaling analyzer so that the signaling analyzer analyzes the separated signaling packets to identify the communications, and (b) a flow engine obtaining respective packet media streams corresponding to captured communications from the separated packet media streams in accordance with a trigger applied to the communications as identified by the signaling analyzer, and producing flow information records for the obtained packet media streams. An application analyzes the flow information records produced by the flow engine.

In addition, the present invention provides an apparatus for capturing packets on a link of a packet network to thereby capture communications transmitted via packets on the link. Each communication has corresponding signaling packets and at least one corresponding packet media stream. The apparatus includes (a) a signaling analyzer; (b) a filter capturing substantially all the packets in real-time and filtering the captured packets to separate the signaling packets from the packet media streams, the separated signaling packets being provided to the signaling analyzer so that the signaling analyzer analyzes the separated signaling packets to identify the communications; (c) a flow engine obtaining respective packet media streams corresponding to captured communications from the separated packet media streams, in accordance with a trigger applied to the communications as identified by the signaling analyzer, and producing flow information records for the obtained packet media streams; and (d) an application analyzing the flow information records produced by the flow engine.

Moreover, the present invention provides an apparatus including (a) a signaling analyzer; (b) a filter capturing substantially all the packets on a link of a packet network in real-time and filtering the captured packets to separate signaling packets from packet media streams, the separated signaling packets being provided to the signaling analyzer so that the signaling analyzer analyzes the separated signaling packets and thereby produces call flow records; (b) call flow logic which produces control signals from a trigger applied to information provided by the call flow records; (c) a flow engine obtaining respective packet media streams corresponding to captured communications from the separated packet media streams, in accordance with the control signals, and producing flow information records for the obtained packet media streams; and (d) an application analyzing the flow information records produced by the flow engine.

The present invention also provides a method including (a) capturing packets on a link of a packet network in real-time to thereby capture communications transmitted via packets on the link, each communication having corresponding signaling packets and at least one corresponding packet media stream; (b) filtering the captured packets to separate the signaling packets from the packet media streams; (c) analyzing the separated signaling packets to identify the communications; (d) obtaining respective packet media streams corresponding to captured communications from the separated packet media streams, in accordance with a trigger applied to the identified communications; (e) producing flow information records for the obtained packet media streams; and (f) analyzing the flow information records.

BRIEF DESCRIPTION OF THE DRAWINGS

Aspects of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
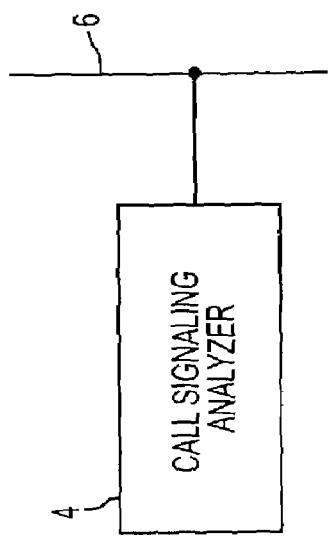
FIG. 1 (prior art) is a diagram illustrating the use of a call signaling analyzer to monitor a VOIP telephone call.

Reference will now be made in detail to the present preferred embodiments of the present invention, examples of which are illustrated in the accompanying drawings, wherein like reference numerals refer to like elements throughout.

Figure 2:
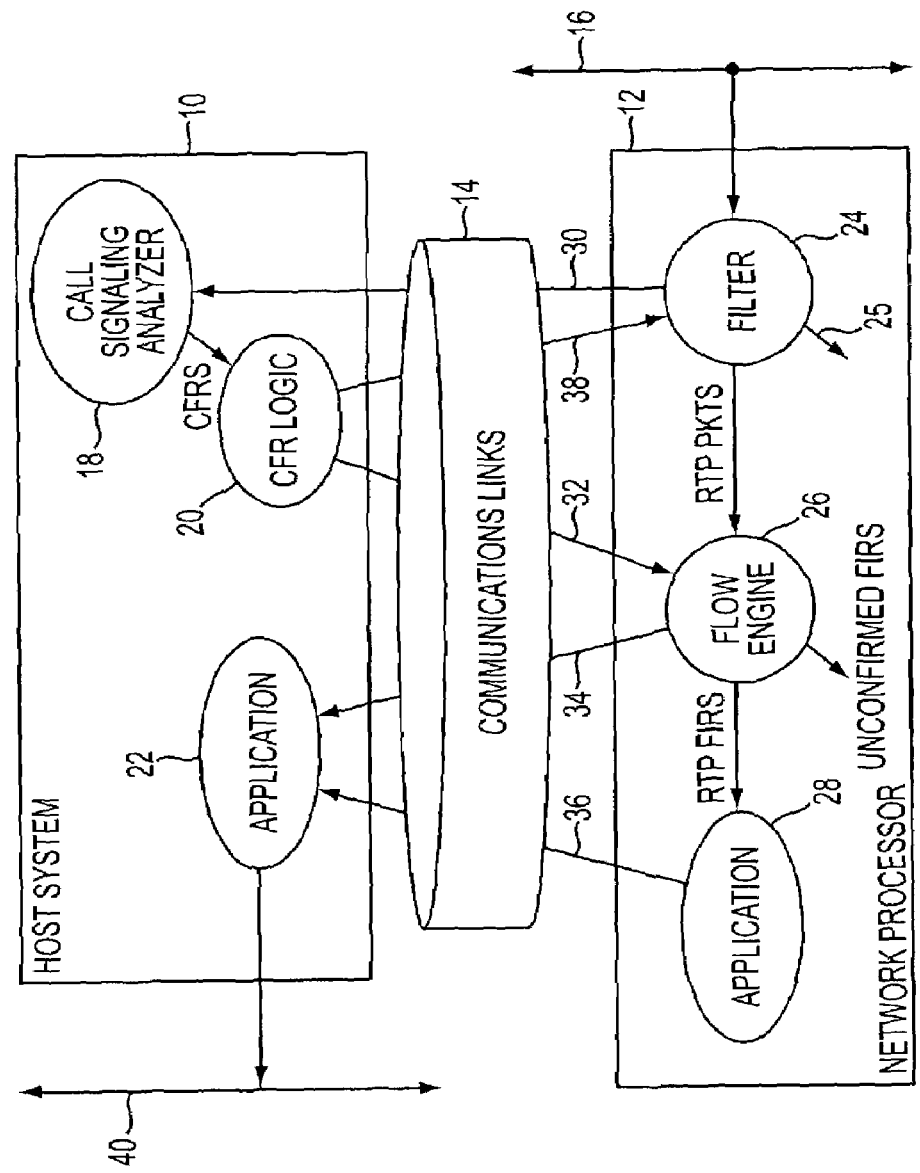
FIG. 2 is a diagram illustrating the use of a network processor and host system to monitor all communications on a network link, according to an embodiment of the present invention.

FIG. 2 is a diagram illustrating the use of a network processor and host system to monitor all communications on a network link, according to an embodiment of the present invention. Referring now to FIG. 2, a host system 10 communicates with a network processor 12 via communication links 14 to monitor communications transmitted through at least one network link 16 of a packet network under test.

The packet network is not limited to being based on any particular network protocol. Moreover, the packet network is not limited to being based on any particular technology, and might be based, for example, on wired technology, wireless technology, electrical technology, optical technology, local area network (LAN) technology, wide area network (WAN) technology, or any combination of these. As an example, the network under test might be the Internet or a private packet network.

Communications transmitted through network link 16 are packet communications which include signaling packets and media packets. Signaling packets include information indicating, for example, when a communication is initiated, when the communication ends, etc. The signaling packets are based on a signaling protocol. Signaling protocols include, for example, SIP, MGCP, H.323, RADIUS, NCS, etc. There are many different signaling protocols that can be used. However, the present invention is not limited to any particular signaling protocol, or any particular information being conveyed by the signaling packets. The use of signaling packets and signaling protocols is well-known.

The media packets carry the data of the communications. In various embodiments of the present invention, the media packets might typically include any type or protocol of streaming media such as, for example, video, voice, email, stock price information, etc. As an example, the present invention is useful for analyzing communications which are voice over Internet Protocol (VOIP) telephone calls. Real-time protocol (RTP) is a protocol used for VOIP phone calls, but there are many other protocols which can be used. Therefore, various embodiments of the present invention relate to the analysis of communications which are VOIP telephone calls with RTP media packets. However, the present invention is not limited to media packets carrying any particular type of data or being based on any particular protocol.

Host system 10 includes, for example, a call signaling analyzer 18, call flow record (CFR) logic 20 and an application 22.

Network processor 12 includes, for example, a filter 24, a flow engine 26 and an application 28. Generally, a network processor is a known device specialized for handling packets. As an example, network processor 12 can be based on the Intel IXP 1200 series network processor. Other manufacturers, such as Motorola and IBM, also produce various types of network processors.

Filter 24 captures substantially all the packets on network link 16 in real-time to thereby capture the communications transmitted via packets on network link 16, and filters the captured packets to separate the signaling packets from the packet media streams. That is, filter 24 separates the signaling packets from the media packets forming the packet media streams. Unmatched packets 25 would, for example, typically be discarded. For example, filter 24 checks every packet captured from network link 16 to determine if the packet is a signaling packet, a media (data) packet, or some other type of packet which should be discarded.

The separated signaling packets are provided to call signaling analyzer 18 via communication link 30 so that call signaling analyzer 18 analyzes the separated signaling packets to thereby identify the communications transmitted on network link 16. Call signaling analyzer 18 produces call flow records (CFRs) which, generally, are condensed summary records of the communications identified by call signaling analyzer 18.

For example, if the communications are VOIP telephone calls, call signaling analyzer 18 analyzes the separated signaling packets to identify VOIP telephone calls. For example, as part of the identification of a VOIP telephone call, call signaling analyzer 18 might identify when a VOIP telephone call is initiated or discontinued. Call signaling analyzer 18 would then produce corresponding CFRs.

There are many different ways that call signaling analyzer 18 can identify a communication. For example, to identify a communication, a call signaling analyzer 18 might analyze, for example, starts/stops, the IP addresses and/or ports that the media will be on for that call. Accordingly, there are many different ways in which call signaling analyzer 18 can identify a communication from signaling packets, and the present invention is not limited to any particular manner. Moreover, the identification of a call from analyzing signaling packets is known. Further, call signal analyzers, such as call signal analyzer 18 are known devices for analyzing signaling packets.

CFR logic 20 produces control signals from the CFRs produced by call signaling analyzer 18. Generally, the control signals are for controlling flow engine 26 in accordance with the communications as identified by call signaling analyzer 18. The control signals can be provided to flow engine 26 by, for example, communication link 32. Generally, CRF logic 20 obtains information in the form of CFRs from call signaling analyzer 18 and transmits appropriate commands to network processor 12 to capture flows corresponding to identified communications. Generally, CFR logic 20 is a translator between call signaling analyzer 18 and network processor 12. For example, if call signaling analyzer 18 identifies a communication as a conference call between a plurality of participants, CFR logic 20 would send appropriate control signals to flow engine 26 to capture all the packet media streams corresponding to the conference call. The control signals might be, for example, signals that provide direct instructions to flow engine 26, or might simply be information regarding the communications and which is used by flow engine 26 to formulate it's own instructions or commands. Therefore, the control signals are not limited to including any specific information or being any specific type of command.

Accordingly, from the media packets separated by filter 24, flow engine 26 obtains the packet media streams corresponding to the captured communications in accordance with the control signals, and produces flow information records (FIRs) for the obtained packet media streams. Generally, FIRs are summaries of the packets that arrived on a respective packet media stream corresponding to a respective communication. Typically, a FIR might include an identifier for the respective communication. Moreover, typically, a FIR might indicate what computer is the originator of the packet media stream, what computer is the destination of the packet media stream, etc. However, there are many different types of information that could be included in a FIR, and the present invention is not limited to a FIR including any specific information.

If flow engine 26 does not receive appropriate control signals indicating that a respective packet media stream should be monitored or analyzed, in some embodiments of the present invention flow engine 26 might simply discard the FIRs for the respective packet media stream. By discarding FIRs for packet media streams which do not appear to be relevant, the workload of flow engine 26 can be reduced.

Applications 28 and 22 are software-based application which analyze the FIRs to produce useful information, such as, for example, a quality of service analysis, a flow analysis, management alarms, statistics, data records for subsequent applications, etc. Such information might be useful, for example, to a network administrator accessing host system 10 through management network 40. Communication link 34 can be used to forward FIRs from flow engine 26 to application 22. Communication link 36 can be used to send flow results to host system 10.

In embodiments of the present invention, a communication link 38 might also be provided to allow host system 10 to dynamically reconfigure network processor 12 to capture the necessary signaling protocols, send the appropriate signaling packets to call signaling analyzer 18 and/or send appropriate media packets to flow engine 26. For example, in such embodiments, CFR logic 20 produces filter control signals for dynamically reconfiguring filter 24 in accordance with the analysis of the separated signaling packets by call signaling analyzer 18. In this manner, as an example, as communication protocols change, filter 24 can be dynamically reconfigured and appropriate media packets can be relayed to flow engine 26.

Generally, the present invention recognizes that a very large number of packets can travel over a high-speed network link, where the packets correspond to a plurality of communications transmitted over the network link. Of these packets, only a very small percentage are signaling packets. For example, in a typical network, approximately 5% or less of the packets traveling over the network might be signaling packets. Therefore, the present invention combines the use of network processor 12 with host system 10 to capture preferably all the packets on network link 16, separate the signaling packets from the remaining packets, identify the communications from the signaling packets, detect the packet media streams of the captured communication in accordance with the identified communications, and analyze the detected packet media streams.

More specifically, network processors are optimized devices for handling packets. Therefore, in embodiments of the present invention, network processor 12 is responsible for passively capturing, for example, 100% of the packets on network link 16 and classifying the packets into FIRs. Packet classification is accomplished, for example, by first discarding any packets that are not potentially useful, such as, for example, non-signaling. For example, if the communications are VOIP telephone calls, non-signaling packets and non-RTP packets may be discarded. Network processor 12 then forwards the signaling packets to call signaling analyzer 18 of host system 10 and waits for host system 10 to indicate the start and completion of packet media streams (i.e., RTP flows). Meanwhile, network processor 12 continues to capture all media packets (such as RTP packets for VOIP telephone calls) and produces corresponding FIRs. Network processor 12 stores the FIRs until host system 10 identifies communications to which the packet media streams correspond. When a communication is identified, network processor 12 can begin forwarding FIRs for the packet media streams corresponding to the identified communication to application 28 and/or application 22. If FIRs are being stored, and a respective communication is not identified for a packet media stream to which the stored FIRs correspond, then the stored FIRs would typically be discarded after a specific amount of time. In various embodiments of the present invention, network processor 12 can either forward the FIRs to host system 10 or can compute high-level results from the FIRs and forward the high-level results to host computer 10.

Accordingly, network processor 12 can, for example, process substantially all packets on network link 16 and produce comprehensive results in, for example, real-time. Network processor 12 accomplishes this with hardware specialized for processing packets, and by communicating to host system 10 in real-time and dynamically reconfiguring itself to handle high traffic levels. Network processor 12 can, for example, produce comprehensive FIRs in real-time for all packet media streams (i.e., flows) on a high-speed packet network link. Accordingly, for example, all packet media streams found on network link 16 can be captured and condensed into FIRs which can then be processed by host system 10 and/or network processor 12. This allows host system 10 and/or network processor 12 to perform high level computations on the packet media streams and to produce, for example, a quality of service analysis and/or additional flow analysis.

By appropriately using applications 22 and 28 and the processing power of host system 10 and/or network processor 12, scalability and load balancing can be improved.

The following is an example of the operation of host system 10 and network processor 12 in FIG. 2, according to an embodiment of the present invention. Assume that 10,000 VOIP telephone calls are traveling over network link 16, and that it is desired to monitor the quality of service of the telephone calls. Each VOIP telephone call includes signaling packets and media packets. For this example, it will be assumed that the signaling packets are based on the SIP protocol, and the media packets are real-time protocol (RTP) packets. Other packets, such as those relating to email, http, etc., also travel over network link 16. For this example, it will be assumed that CFR logic 20 has initially configured filter 24 to send SIP packets to call signaling analyzer 18 and to send RTP packets to flow engine 26.

Therefore, in this example, filter 24 captures all packets traveling over network link 16, and filters the captured packets to separate the signaling packets (e.g., the SIP packets) from the media packets (e.g., the RTP packets). Filter 24 sends the signaling packets to call signaling analyzer 18, and sends the RTP packets to flow engine 26. Filter 24 discards the other packets, such as those relating to email, http, etc.

Flow engine 26 stores all the RTP packets until it knows what to do with them. Call signaling analyzer 18 collects the SIP packets, analyzes the collected SIP packets to identify respective VOIP telephone calls, and produces corresponding CFRs. CFR logic 20 analyzes the CFRs and determines what packet media streams correspond to each identified VOIP telephone call. For example, with a VOIP telephone call, there would typically be two packet media streams corresponding to each VOIP telephone call—one packet media stream from the originating party to the destination party, and one packet media stream from the destination party to the originating party. In a conference call, there might be a plurality of packet media streams corresponding to the respective conference call. CFR logic 20 then sends appropriate control signals to flow engine 26 so that flow engine 26 can obtain the packet media streams corresponding to the identified VOIP telephone calls. For example, flow engine 26 might check a buffer (not illustrated) and retrieve the RTP packets in the buffer that pertain to the two packet media streams corresponding to a respective, identified VOIP telephone call. For this respective VOIP telephone call, flow engine 26 will keep collecting new RTP packets until it receives an indication from call signaling analyzer 18 that the VOIP telephone call has ended.

Eventually, SIP packets for the respective VOIP telephone call will be captured to indicate that the VOIP telephone call will end. Filter 24 sends these packets to call signaling analyzer 18. Call signaling analyzer 18 then sends CFRs to CFR logic 20 which indicate that the VOIP telephone call will end. CFR logic 20 then sends control signals to flow engine 26 to indicate that the packet media streams for that VOIP telephone call are finished. Accordingly, flow engine 26 stops collecting RTP packets for the respective VOIP telephone call, and sends appropriate FIRs to application 22 and/or application 28, so that a quality of service analysis or additional flow analysis can be performed. Flow engine 26 might send FIRs simultaneously to application 22 and/or application 28 as the VOIP telephone call is in progress, or flow engine 26 might wait for the VOIP telephone call to end, depending on the embodiment.

Therefore, for example, by analyzing the signaling packets, call signaling analyzer 18 recognizes when a new VOIP telephone call is being set up. Call signaling analyzer 18 then causes network processor 12 to be controlled to capture the RTP packets for the respective VOIP telephone call. In this manner, call signaling analyzer 18 operates together with network processor 12 to capture and analyze the RTP packet media streams for all the VOIP telephone calls transmitted on network link 16.

Therefore, in embodiments of the present invention, call signaling analyzer 18 can dynamically configure network processor 12 so that network processor 12 captures the right packets at the right time. More specifically, by analyzing the signaling packets, call signaling analyzer 18 directs network processor 12 to, for example, capture, categorize, correlate and analyze the different packet media streams. For example, if 10,000 VOIP telephone calls are being transmitted over network link 16, call signalizing analyzer 18 helps network processor 12 handle this full load of work as the VOIP telephone calls are being set up and ended. In this manner, call signaling analyzer 18 and network processor can capture 100% of the VOIP telephone calls transmitted over network link 16.

Moreover, as described above, in various embodiments of the present invention, filter 24 discards packets which are not related to the communications which are to be monitored. Similarly, as described above, in various embodiments of the present invention, if flow engine 26 does not receive appropriate control signals indicating that a respective packet media stream should be monitored or analyzed, flow engine 26 discards the FIRs for the respective packet media stream. Such discarding of packets and FIRs allows network processor 12 to keep up with a high speed network link 16 through which a very large number of packets are being transmitted.

According to embodiments of the present invention, all packets on a link of a packet network are captured in real-time, to thereby capture all communications transmitted via packets on the link. The packet media streams of all the captured communications are detected an analyzed. The communications are, for example, VOIP telephone calls. The packet media streams are comprised of, for example, RTP packets.

According to embodiments of the present invention, all packets on a link of a packet network are captured in real-time, to thereby capture communications transmitted via packets on the link. The captured packets are filtered to separate the signaling packets from the packet media streams. The separated signaling packets are analyzed to identify the communications. The packet media streams corresponding to the captured communications are then obtained in accordance with the identified communications. For example, in above embodiments of the present invention, call signaling analyzer 18 identifies communications by analyzing the signaling packets. Flow engine 26 then obtains the packet media streams corresponding to the captured communications in accordance with the communications as identified by call signaling analyzer 18. FIRs for the obtained packet media streams are then produced and analyzed to provide, for example, a quality of service analysis or additional flow analysis.

As indicated above, separated signaling packets are analyzed to identify the communications. The present invention is not limited to any particular information being required to identify a communication, or to any particular information being communicated to indicate that a communication has been identified. Similarly, as indicated above, packet media streams corresponding to the communications are obtained. The present invention is not limited to any particular information being required to obtain a packet media stream, or to any particular information being required to indicate that a packet media stream has been obtained.

As indicated above, applications 22 and 28 can be used to provide, for example, a quality of service analysis or flow analysis. However, applications 22 and 28 are not limited to providing any particular type of analysis. Instead, applications 22 and 28 simply provide desired, useful information.

Embodiments of the present invention as shown in FIG. 2 are useful for capturing and analyzing all communications transmitted on network link 16. For example, all VOIP telephone calls being transmitted on network link 16 can be detected and analyzed, so that a quality of service analysis can be performed for all the VOIP telephone calls.

However, it is often desirable to obtain specific packet media streams, without obtaining all packet media streams, in accordance with a trigger. As an example, for law enforcement purposes, assume that it is desirable to monitor the packet media streams of any person that is called by Person A. In this example, the telephone number or unique identifier of Person A might be the trigger. When the telephone number or unique identifier of Person A is recognized from an analysis of signaling packets, appropriate action must be taken to determine who was called by Person A, and to obtain and monitor the packet media streams of the person that was called.

Figure 3:
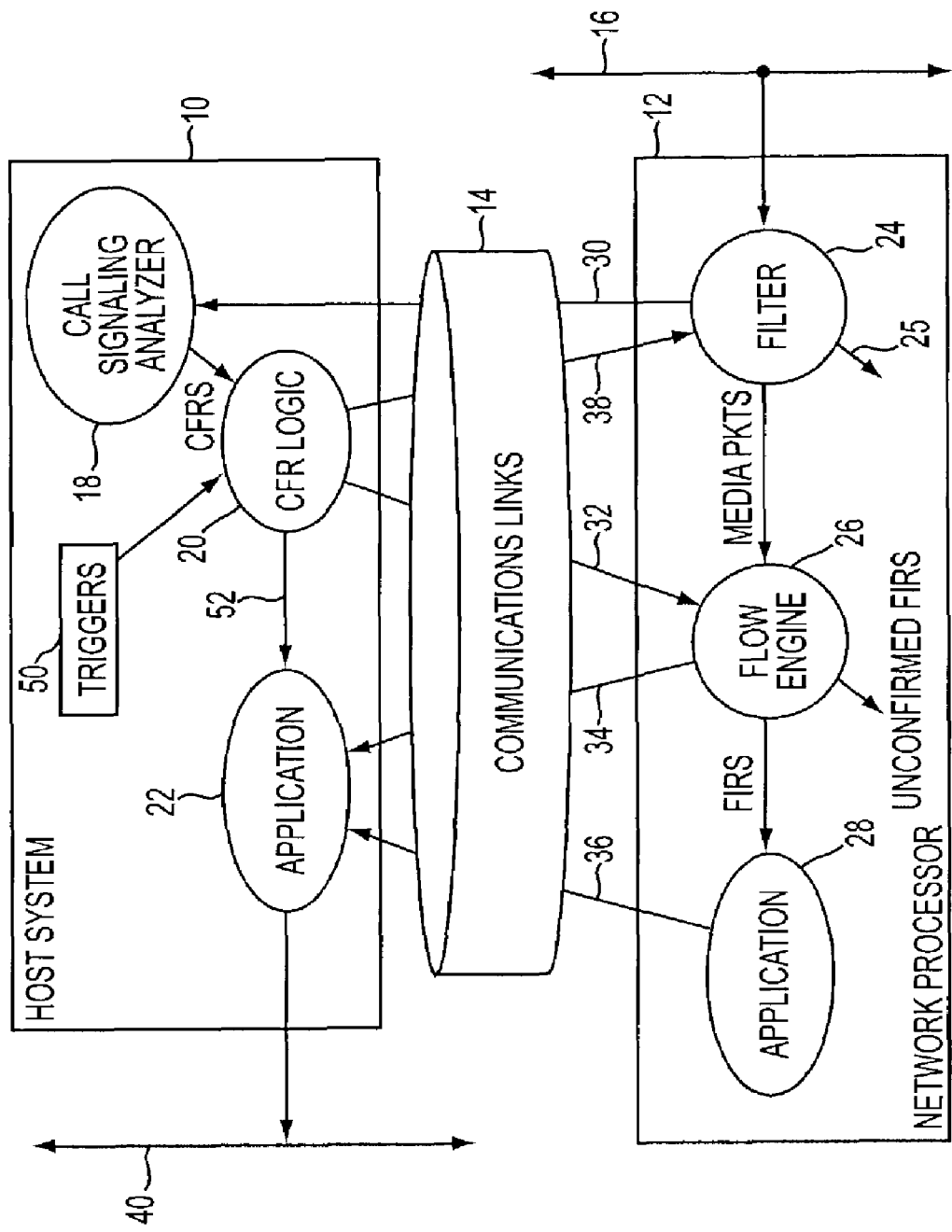
FIG. 3 is a diagram illustrating the use of triggers to detected respective packet media streams on a network link by a network processor and a host system, according to an additional embodiment of the present invention.

FIG. 3 is a diagram illustrating the use of triggers to detected respective packet media streams by network processor 12 and host system 10, according to an additional embodiment of the present invention. As will be described in more detail below, in FIG. 3, host system 10 communicates with network processor 12 to detect respective packet media streams from captured packets in accordance with a trigger.

Referring now to FIG. 3, network processor 12 captures substantially all the packets on network link 16 in real-time. Filter 24 filters the captured packets to separate the signaling packets from the packet media streams. The separated signaling packets are provided to call signaling analyzer 18 via communication link 30 so that call signaling analyzer 18 analyzes the separated signaling packets and thereby produces CRFs.

Triggers 50 are specifications for triggering capture of respective packet media streams. Triggers 50 might be provided, for example, by a network administrator accessing host system 10 via, for example, management network 40. However, the present invention is not limited to triggers being provided in any specific manner by any specific person.

Triggers 50 are fed to CFR logic 20. CFR logic 20 applies triggers 50 to information provided by the CFRs from call signaling analyzer 18 to determine if there is a need to obtain respective packet media streams. If so, CFR logic 20 issues a control signal to flow engine 26. The control signal is transmitted to flow engine 26 via communication line 32. In accordance with the control signal, flow engine 26 obtains respective packet media streams corresponding to captured communications from the separated packet media streams. In various embodiments of the present invention, flow engine 26 produces FIRs for the obtained packet media streams, and application 22 and/or application 28 analyzes the FIRs.

In some situations, CFR logic 20 might also provide a control signal to filter 24 to dynamically reconfigure filter 24. For example, based on the information provided by CFRs, CFR logic 20 might produce a control signal which is transmitted to filter 24 via communication link 38 to dynamically reconfigure filter 24 so that filter 24 sends appropriate media packets to flow engine 26 and/or sends appropriate signaling packets to call signalizing analyzer 18.

Therefore, via communication link 38, host system 10 can dynamically reconfigure network processor 12 to capture the necessary signaling protocols, send the appropriate signaling packets to call signaling analyzer 18 and/or send appropriate media packets to flow engine 26. In this manner, as an example, as communication protocols change, filter 24 can be dynamically reconfigured.

Accordingly, via control signals provided by CFR logic 20, network processor 12 can determine which packets to process and how to analyze and report the results to host system 10.

Moreover, via the use of triggers 50, CFR logic 20 determines whether to capture respective packet media streams. As a result, it is not necessary to capture all packet media streams. For example, via the use of triggers 50, CFR logic 20 issues a control signal to dynamically reconfigure filter 24 to forward appropriate media packets to flow engine 26, and to discard irrelevant packets. CFR logic 20 also issues a control signal to dynamically reconfigure flow engine 26 to obtain respective packet media streams in accordance with triggers 50 as applied to information provided by the CFRs.

Therefore, CFR logic 20 applies triggers 50 to information from CFRs provided by call signaling analyzer 18 to produce dynamic specification changes that are sent to network processor 12 (via, for example, control signals) to dynamically reconfigure filter 24 and/or flow engine 26. CFR logic 20 should include information (such as logic rules) for applying triggers 50 to CFRs to produce commands for controlling network processor 12, and might typically include correlation fields used later by host system 10 to perform a correlation between different protocols. The application of a trigger to information provided by CFRs would be understood by a person of ordinary skill in the art.

Moreover, the creation of specific CFR logic to provide a specific type of control would be well-understood by a person of ordinary skill in the art based on the disclosure herein.

Accordingly, CFR logic 20 uses triggers 50 to perform more advanced control of network processor 12, as compared to the embodiment in FIG. 2.

The following is an example of the operation of host system 10 and network processor 12 in FIG. 3, according to an embodiment of the present invention. For this example, assume that it is desirable to monitor the VOIP telephone calls of any person that is called by Person A. In this example, the telephone number or unique identifier of Person A might be the trigger. Moreover, in this example, it will be assumed that the packet media streams for VOIP telephone calls are RTP packets, and that filter 24 is initially configured to forward RTP packets to flow engine 26. In this example, network processor 12 captures all packets on network link 16. Filter 24 filters the captured packets so that signaling packets are forwarded to call signaling analyzer 18 and RTP media packets are forwarded to flow engine 26. Call signaling analyzer 18 analyzes the signaling packets and produces appropriate CFRs. CFR logic 20 would, for example, compare the telephone number or unique identifier (i.e., the trigger) to information provided by the CFRs to determine if a telephone call was made by Person A. In this example, assume that Person A called Person B. In this example, CFR logic 20 would determine from the application of the trigger to the CFRs that Person A called Person B. CFR logic 20 would then send a control signal to flow engine 26 to obtain all RTP packet media streams related to Person B. Flow engine 26 would obtain the required RTP packet media streams, produce appropriate FIRs and forward the FIRs to application 22 and/or application 28.

As indicated above, in some situations, CFR logic 20 might also provide a control signal to filter 24 to dynamically reconfigure filter 24. For example, in the present example where it is determined that the VOIP telephone calls of Person B are to be monitored, assume that it is also desired to capture video transmitted by any person that Person A called. Accordingly, in the present example, since Person A called Person B, CFR logic 20 would send a control signal to filter 24 to dynamically reconfigure filter 24 so that filter 24 accepts video media packets and forwards the accepted media packets to flow engine 26. Flow engine 26 would then obtain the video packet media streams transmitted by Person B and produce corresponding FIRs. In this example, filter 24 might be controlled to accept and forward all video media packets to flow engine 26, or might be configured to forward only video media packets transmitted by Person B to flow engine 26 and to discard other video media packets.

Of course, the above example (e.g., monitoring the packet media streams of any person that is called by Person A ) is only one specific example, and many variations are possible. Moreover, many different triggers could be used in this example to obtain the desired packet media streams, and the present invention is not limited to the specific example described for a trigger.

As indicated above, a trigger is a specification for triggering capture of respective packet media streams. A trigger can be useful, for example, to detect business intelligence issues. For example, a trigger may be useful to determine whether a respective long distance carrier that transmitted VOIP telephone calls over network link 16 charged accurately for the minutes used in the VOIP telephone calls. For fraud detection, triggers can be used, for example, to determine if there were multiple recurring attempts of Party A to connect to another party that Party A is not supposed to be connecting. There are an unlimited number of possible examples for the use of triggers, and the present invention is not limited to any particular example. Moreover, in view of the disclosure herein, it is respectfully submitted that a person of ordinary skill in the art would understand the nature of a trigger, and how to use a trigger to capture packet media streams to achieve a desired objective.

For networks running multiple protocols, events can occur in real-time within one protocol that must be correlated to a completely different network protocol perhaps at completely different network locations. Therefore, in embodiments of the present invention, CFR logic 20 analyzes CFRs from multiple protocols and sends real-time control signals to filter 24 and/or flow engine 26. Such analysis of multiple correlated network protocols provides a significant troubleshooting tool to network operations.

For example, a communication, such as a VOIP telephone call, might travel over several heterogeneous networks using different protocols. Therefore, network processor 12 might capture packets from several different networks using several different protocols, so that many of the packets captured by network processor 12 relate to the same VOIP telephone call, but are using different protocols. In this situation, network link 16 would actually represent several different connection points to several different networks. Accordingly, in various embodiments of the present invention, CFR logic 20 analyzes the CFRs for these different packets based on different protocols, and correlates these protocols so that they are all associated with the same VOIP telephone call. CFR logic 20 can then send real-time control signals to filter 24 and/or flow engine 26.

As additional example, a trigger might be the detection of a formatting error when trying to correlate packets in a respective protocol on a specific network to packets in a different protocol on a different network and related to the same communication. When such a formatting error occurs, CFR logic 20 might then send appropriate control signals to filter 24 and/or flow engine 26 to capture packet media streams for the respective communication.

Accordingly, by having a real-time, dynamically reconfigurable filter 24 and flow engine 26 triggered by a network event (or data), correlation of the data which exists within multiple protocols is possible. Therefore, via the use of triggers 50, host system 10 and network processor 12 can correlate data within different network protocols related to the same communication. For example, as indicated above, CFR logic 20 can apply trigger 50 to information provided by CFRs to correlate data within different network protocols related to the same communication.

Accordingly, according to embodiments of the present invention, host system 10 dynamically reconfigures network processor 12 to allow network processor 12 to perform a variety of different network analysis tasks. Each of these tasks might rely on the ability to dynamically reconfigure the specifications of filter 24 and/or flow engine 26.

Further, as indicated by reference numeral 52 in FIG. 3, in various embodiments of the present invention, host system 10 can correlate analyzed results from application 22 to captured communications. More specifically, host system 10 correlates CFRs with actual results indicated by an application, such as application 22. For example, host system 10 can determine a correlation between a measurement that was made and the analysis of the signaling protocols by call signaling analyzer 18. As a specific example, host system 10 might be able to make a correlation of poor voice quality measurements to captured VOIP telephone calls that were terminated abnormally or early. Such a correlation would be important, for example, to a network administrator. In this example, the trigger might be, for example, the detection of an abnormal termination of a VOIP telephone call. Therefore, CFR logic 20 would apply this trigger to information provided by the CFRs from call signaling analyzer 18, to determine when a respective VOIP telephone call was terminated abnormally or early. When such an abnormal or early termination occurs, CFR logic 18 produces a control signal so that flow engine 26 obtains the packet media streams for the respective VOIP telephone call and produces corresponding FIRs, and application 22 analyzes the FIRs to produce a quality measurement for the VOIP telephone call. As indicated by reference numeral 52, host system 10 correlates the quality measurement by application 22 with the VOIP telephone call. Of course, the present invention is not limited to this specific example, and many other correlations and triggers are possible.

Although reference numeral 52 shows a correlation with results from application 22, in various embodiments of the present invention a correlation might be made, for example, with results from application 28, or with results from an application provided by a third party.

Applications 22 and 28 as used in FIG. 3 might include, for example, (a) CALEA—lawful voice and data intercept, the dynamic correlation of RTP (or other data) to signaling protocols such as H.323, SIP or MGCP; (b) RQM—RTP quality of service measurements correlated to the network signaling protocols which established a call; (c) VQT—voice quality testing; (d) advanced network performance monitoring and correlation; (e) intrusion detection, (f) business intelligence; and (g) third-party software integration. However, applications 22 and 28 as used in FIG. 3 are not limited to providing any particular type of analysis. Instead, applications 22 and 28 should simply provide desired, useful information.

Application 22 and/or 28 might even be a simple interface to an external high level application produced by another entity. The high level application might then perform a display of a correlated protocols analysis.

The present invention is not limited to any particular location of host system 10 and network processor 12 in relation to each other. For example, host system 10 and network processor 12 might be physically located in the same room of the same building, or might be located remotely (for example, in different rooms of the same building, in different buildings, in different cities or in different countries) from each other. Host system 10 and network processor 12 might even be connected to each other from remote locations via an appropriate communication link such as, for example, the Internet. Moreover, applications 22 and 28 are not limited to being in any specific location, or to being on host system 10 or network processor 12. For example, application 22 and/or 28 might be located remotely from host system 10 and/or network processor 12, and be appropriately connected to host system 10 and/or network processor 12 via an appropriate communication link, such as via, for example, the Internet.

FIGS. 2 and 3 show communications links 14 (which includes respective communication links 32, 34, 36 and 38) to communication between various devices in host system 10 and network processor 12. However, the specific arrangement of communication links in FIGS. 2 and 3 is only intended as an example, and there are many possible variations of communication links which can be used to allow communication between the various devices in host 10 and network processor 12. Moreover, communication links 14 are not limited to any particular technology and might be based, for example, wired technology, wireless technology, electrical technology, optical technology, local area network (LAN) technology, wide area network (WAN) technology, or any combination of these. Moreover, communication links 14 are not limited to any communication protocol, and may be heterogeneous. As an example, communication links 14 might be the Internet. Therefore, the present invention is not limited to any specific arrangement of communication links.

The network under test, which includes network link 16, might be a high-speed network. The present invention is especially useful with a high-speed network, as network processor 12 has the ability to capture and filter all packets traveling on network link 16. Generally, a high-speed network would have a clock rate greater than 10 megabits/s. However, the present invention is not limited for use with a high-speed network.

Moreover, network link 16 in FIGS. 2 and 3 could represent multiple links in a network under test. For example, network processor 12 could be used to capture packets at multiple points in a network under test. In FIGS. 2 and 3, network link 16 would represent such multiple points.

Here, a "link", such as network link 16, is simply intended to indicate some type of communication line on the network. Thus, network link 16 might represent, for example, a point at the output of a switch, router or other device on a network. Or, as an example, network link might be a point along a communication line connecting two nodes of the network under test.

Various examples described herein relate to communications which are Internet Protocol (IP), real-time protocol (RTP) voice communications (i.e., voice over Internet (VOIP) telephone calls). However, the present invention is not limited to any particular type of communication, or to any particular protocols. Therefore, of course, packet media streams captured by the embodiments in FIGS. 2 and 3 are not limited to any particular protocol. Moreover, signaling packets are not limited to any particular protocol.

In various embodiments of the present invention, a network processor is described as capturing "all" packets transmitted through at least one network link. In many embodiments, it may be possible to capture 100% of the packets. However, the present invention is not limited to capturing 100% of the packets. For example, it is often difficult or unnecessary to capture 100% of the packets. Therefore, in embodiments of the present invention, a network processor might capture "substantially all" the packets. Here, "substantially all" the packets indicates that, for example, at least 90%, and more preferably at least 95%, of the packets are captured.

FIGS. 2 and 3 show the use of applications 22 and 28. In various embodiments of the present invention, applications 22 and 28 might be, for example, the same application, different applications, serial components of the same application, or non-serial components of the same application. Therefore, a respective application can reside on host system 10 and/or network processor 12. In this manner, if desired, application processing can be shared between host system 10 and network processor 28, or scaling can be easily accomplished.

Although processing is described above as being performed in real-time, the present invention is not limited to such performance in real-time. For example, FIRs might be analyzed in non-real-time. Also, flow engine 26 might produce the FIRs in non-real-time.

According to above embodiments of the present invention, a network processor captures substantially all packets on a link of a packet network in real-time to thereby capture communications transmitted via packets on the link. The network processor is dynamically reconfigurable to detect respective packet media streams from the captured packets in accordance with a trigger.

Various operations are described herein as being performed "dynamically." For example, in various embodiments of the present invention, network processor 12 is "dynamically" reconfigured. "Dynamically" reconfigured indicates that the operating specifications of the device are changed, or reconfigured, as the device operates, without shutting down and restarting the device. Preferably, such "dynamic" operations occur in real-time. For example, network processor 12 is dynamically reconfigured in real-time to change the filtering specifications as network processor 12 continues to filter packets. The concept of a component being dynamically reconfigured would be understood by a person of ordinary skill in the art.

As shown in FIGS. 2 and 3, host system 10 includes, for example, a call signaling analyzer 18, CFR logic 20 and an application 22. However, the present invention is not limited to a host system including these specific elements in the specific configuration shown in FIGS. 2 and 3. Instead, various modifications are possible.

Similarly, as shown in FIGS. 2 and 3, network processor 12 includes, for example, a filter 24, a flow engine 26 and an application 28. However, the present invention is not limited to a network processor including these specific elements in the specific configuration shown in FIGS. 2 and 3. Instead, various modifications are possible.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a network processor capturing substantially all packets on at least one link of a packet network in real-time to thereby capture multiple communications transmitted via packets on said at least one link, each communication having corresponding signaling packets and at least one corresponding packet media stream; and
   a host system communicating with the network processor to filter the captured packets to thereby separate the signaling packets from the packet media streams, analyze the separated signaling packets to identify the communications, obtain respective packet media streams corresponding to captured communications from the separated packet media streams in accordance with a trigger applied to the identified communications, produce flow information records for the obtained packet media streams, and analyze the flow information records.

2. An apparatus as in claim 1, wherein the network processor is at a remote location from the host system.

3. An apparatus as in claim 1, wherein the trigger is applied to the identified communications to correlate data within different network protocols related to a same communication.

4. An apparatus as in claim 1, wherein the host system and the network processor operate together to correlate results of the analyzed flow information records to captured communications.

5. An apparatus comprising:
   a signaling analyzer; and
   a network processor capturing substantially all packets on at least one link of a packet network in real-time to thereby capture multiple communications transmitted via packets on said at least one link, each communication having corresponding signaling packets and at least one corresponding packet media stream, the network processor including:
      a filter filtering the captured packets to separate the signaling packets from the packet media streams, the separated signaling packets being provided to the signaling analyzer so that the signaling analyzer analyzes the separated signaling packets to identify the communications, and
      a flow engine obtaining respective packet media streams corresponding to captured communications from the separated packet media streams in accordance with a trigger applied to the communications as identified by the signaling analyzer, and producing flow information records for the obtained packet media streams; and an application analyzing the flow information records produced by the flow engine.

6. An apparatus as in claim 5, wherein the signaling analyzer is located remotely from the network processor and communicates with the network processor via communication lines.

7. An apparatus as in claim 6, further comprising:
   a host system which includes the signaling analyzer.

8. An apparatus as in claim 5, wherein the filter and flow engine are dynamically reconfigured in accordance the analysis of the separated signaling packets by the signaling analyzer to filter the captured communications and obtain the media streams, respectively.

9. An apparatus as in claim 5, further comprising:
   a host system which includes the signaling analyzer and is located remotely from the network processor, the host system communicating with the network processor via communication lines.

10. An apparatus as in claim 5, wherein the application resides on at least one of the group consisting of the network processor and a host system which includes the signaling analyzer.

11. An apparatus as in claim 5, wherein the trigger is applied to the identified communications to correlate data within different network protocols related to the same communication.

12. An apparatus as in claim 5, wherein results of the analysis of the flow information records by the application are correlated to captured communications.

13. An apparatus for capturing packets on at least one link of a packet network to thereby capture multiple communications transmitted via packets on said at least one link, each communication having corresponding signaling packets and at least one corresponding packet media stream, the apparatus comprising:
   a signaling analyzer;
   a filter capturing substantially all the packets in real-time and filtering the captured packets to separate the signaling packets from the packet media streams, the separated signaling packets being provided to the signaling analyzer so that the signaling analyzer analyzes the separated signaling packets to identify the multiple communications;
   a flow engine obtaining respective packet media streams corresponding to captured communications from the separated packet media streams, in accordance with a trigger applied to the communications as identified by the signaling analyzer, and producing flow information records for the obtained packet media streams; and
   an application analyzing the flow information records produced by the flow engine.

14. An apparatus as in claim 13, further comprising:
   a network processor which includes the filter and the flow engine; and
   a host system which includes the signaling analyzer.

15. An apparatus as in claim 14, wherein the network processor is located remotely from the host system and communicates with the host system via communication lines.

16. An apparatus as in claim 13, further comprising:
   a network processor which includes the filter and the flow engine; and
   a host system which includes the signaling analyzer and the application.

17. An apparatus as in claim 14, wherein the network processor is located remotely from the host system and communicates with the host system via communication lines.

18. An apparatus as in claim 14, wherein the application is included on at least one of the group consisting of the network processor and the host system.

19. An apparatus as in claim 14, wherein the host system dynamically reconfigures at least one of the group consisting of the filter and the flow engine in accordance the analysis of the separated signaling packets by the signaling analyzer.

20. An apparatus as in claim 13, wherein the trigger is applied to the identified communications to correlate data within different network protocols related to a same communication.

21. An apparatus as in claim 13, wherein results of the analysis of the flow information records by the application are correlated to captured communications.

22. An apparatus for capturing packets on at least one link of a packet network to thereby capture multiple communications transmitted via packets on said at least one link, each communication having corresponding signaling packets and at least one corresponding packet media stream, the apparatus comprising:
   a signaling analyzer;
   a filter capturing substantially all the packets on said at least one link in real-time and filtering the captured packets to separate the signaling packets from the packet media streams, the separated signaling packets being provided to the signaling analyzer so that the signaling analyzer analyzes the separated signaling packets and thereby produces call flow records;
   call flow logic which produces control signals from a trigger applied to information provided by the call flow records;
   a flow engine obtaining respective packet media streams corresponding to captured multiple communications from the separated packet media streams, in accordance with the control signals, and producing flow information records for the obtained packet media streams; and
   an application analyzing the flow information records produced by the flow engine.

23. An apparatus as in claim 22, further comprising:
   a network processor which includes the filter and the flow engine; and
   a host system which includes the signaling analyzer and the call flow logic.

24. An apparatus as in claim 23, wherein the network processor is located remotely from the host system and communicates with the host system via communication lines.

25. An apparatus as in claim 22, further comprising:
   a network processor which includes the filter and the flow engine; and
   a host system which includes the signaling analyzer, the call flow logic and the application.

26. An apparatus as in claim 25, wherein the network processor is located remotely from the host system and communicates with the host system via communication lines.

27. An apparatus as in claim 23, wherein the application is included on at least one of the group consisting of the network processor and the host system.

28. An apparatus as in claim 22, wherein call flow logic produces signals to dynamically reconfigure at least one of the group consisting of the filter and the flow engine in accordance the analysis of the separated signaling packets by the signaling analyzer.

29. An apparatus as in claim 23, wherein call flow logic produces signals to dynamically reconfigure at least one of the group consisting of the filter and the flow engine in accordance the analysis of the separated signaling packets by the signaling analyzer.

30. An apparatus as in claim 22, wherein the trigger is applied to the information provided by the call flow records to correlate data within different network protocols related to the same communication.

31. An apparatus as in claim 22, wherein results of the analysis of the flow information records by the application are correlated to captured communications.

32. A method comprising:
   capturing packets on at least one link of a packet network in real-time to thereby capture multiple communications transmitted via packets on said at least one link, each communication having corresponding signaling packets and at least one corresponding packet media stream;
   filtering the captured packets to separate the signaling packets from the packet media streams;
   analyzing the separated signaling packets to identify the communications;
   obtaining respective packet media streams corresponding to captured communications from the separated packet media streams, in accordance with a trigger applied to the identified communications;
   producing flow information records for the obtained packet media streams; and
   analyzing the flow information records.

33. A method as in claim 32, wherein said capturing and said obtaining the packet media streams are performed by a network processor, and said analyzing the separated signaling packets is performed by a call signaling analyzer.

34. A method as in claim 33, wherein the network processor is at a remote location from the call signaling analyzer, and the network processor and the call signaling analyzer communicate with each other via communication links.

35. A method as in claim 32, wherein the trigger is applied to the identified communications to correlate data within different network protocols related to the same communication.

36. A method as in claim 32, further comprising:
   correlating results of the analysis of the flow information records to captured communications.

37. An apparatus comprising:
   means for capturing packets on at least one link of a packet network in real-time to thereby capture multiple communications transmitted via packets on said at least one link, each communication having corresponding signaling packets and at least one corresponding packet media stream;
   means for filtering the captured packets to separate the signaling packets from the packet media streams;

means for analyzing the separated signaling packets to identify the communications; and means for obtaining respective packet media streams corresponding to captured communications from the separated packet media streams, in accordance with a trigger applied to the identified communications.

* * * * *